US008242884B2

(12) United States Patent
Holcomb et al.

(10) Patent No.: US 8,242,884 B2
(45) Date of Patent: Aug. 14, 2012

(54) CAR FINDER BY CELL PHONE

(75) Inventors: Stephen Holcomb, Southfield, MI (US); Justin McBride, West Bloomfield, MI (US); Toshihiro Wakamatsu, West Bloomfield, MI (US); Akira Sakashita, Southfield, MI (US); Minoru Sasaki, Sagamihara (JP)

(73) Assignee: DENSO International America, Inc., Southfield, MI (US)

( * ) Notice: Subject to any disclaimer, the term of this patent is extended or adjusted under 35 U.S.C. 154(b) by 320 days.

(21) Appl. No.: 12/414,212

(22) Filed: Mar. 30, 2009

(65) Prior Publication Data

US 2010/0073201 A1     Mar. 25, 2010

Related U.S. Application Data

(60) Provisional application No. 61/099,740, filed on Sep. 24, 2008.

(51) Int. Cl.
  *B60R 25/00* (2006.01)
(52) U.S. Cl. ......................................... 340/5.7; 340/990

(58) Field of Classification Search ................... 340/5.7, 340/990, 932.2; 701/208; 702/208
See application file for complete search history.

(56) References Cited

U.S. PATENT DOCUMENTS

| | | | |
|---|---|---|---|
| 2005/0287980 A1* | 12/2005 | Wood | 455/404.1 |
| 2007/0237096 A1* | 10/2007 | Vengroff et al. | 370/254 |
| 2008/0167806 A1* | 7/2008 | Wheeler et al. | 701/208 |
| 2010/0094482 A1* | 4/2010 | Schofield et al. | 701/2 |

* cited by examiner

*Primary Examiner* — Shirley Lu
(74) *Attorney, Agent, or Firm* — Harness, Dickey & Pierce, PLC

(57) ABSTRACT

A system for locating a vehicle may include a hand-held device and a communication device on-board the vehicle. The hand-held device may include a screen, and may be adapted to import a map and display a present location of the hand-held device on the map. The communication device on-board the vehicle may be adapted to communicate a present location of the vehicle to the hand-held device. The hand-held device may be capable of displaying the location of the vehicle and the location of the hand-held device on the map at the same time.

17 Claims, 14 Drawing Sheets

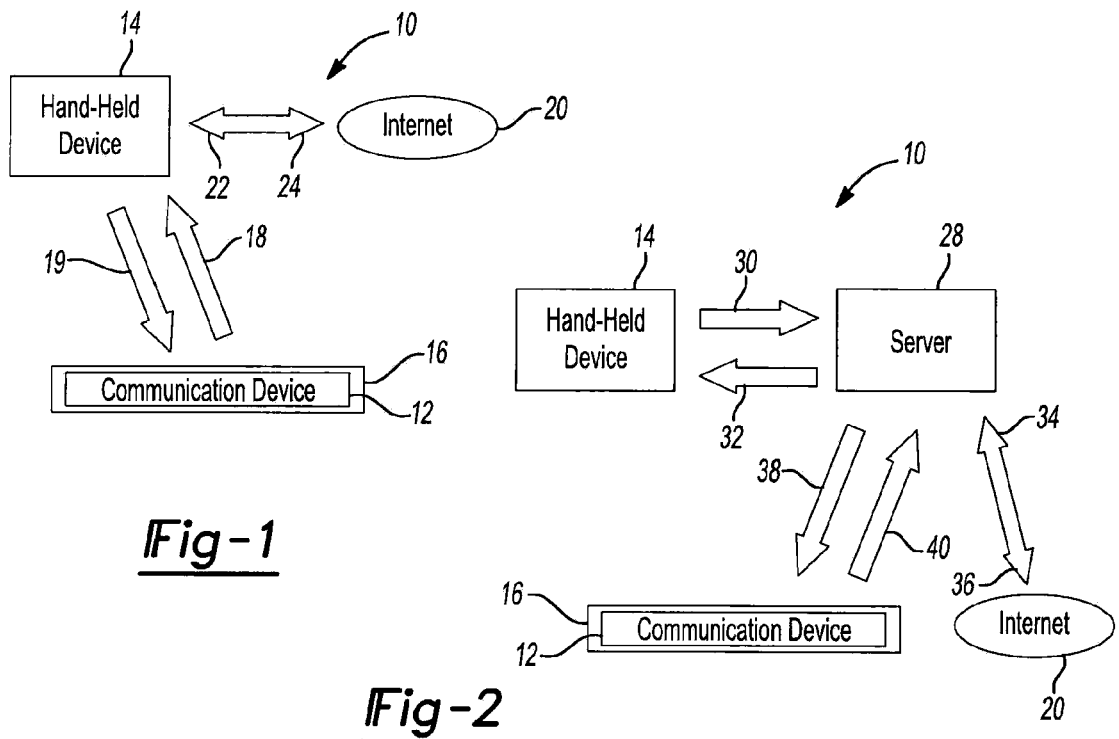
Fig-1
Fig-2
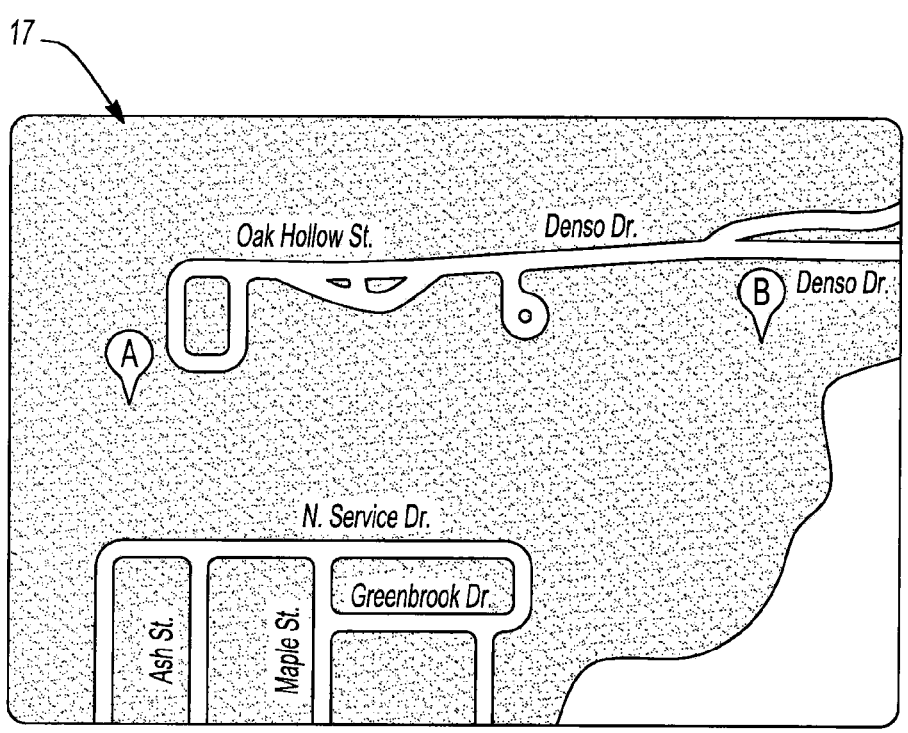
Fig-3

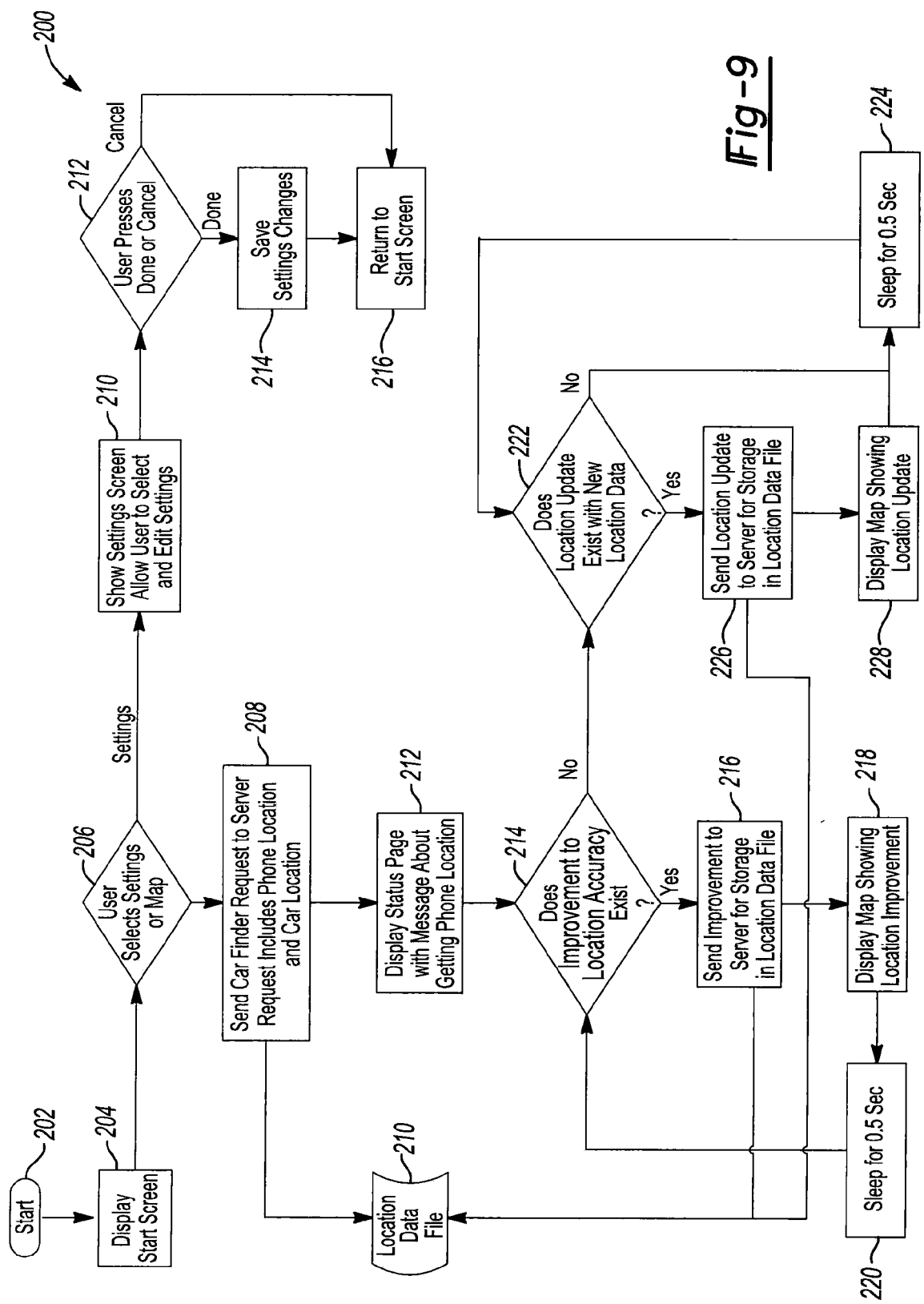

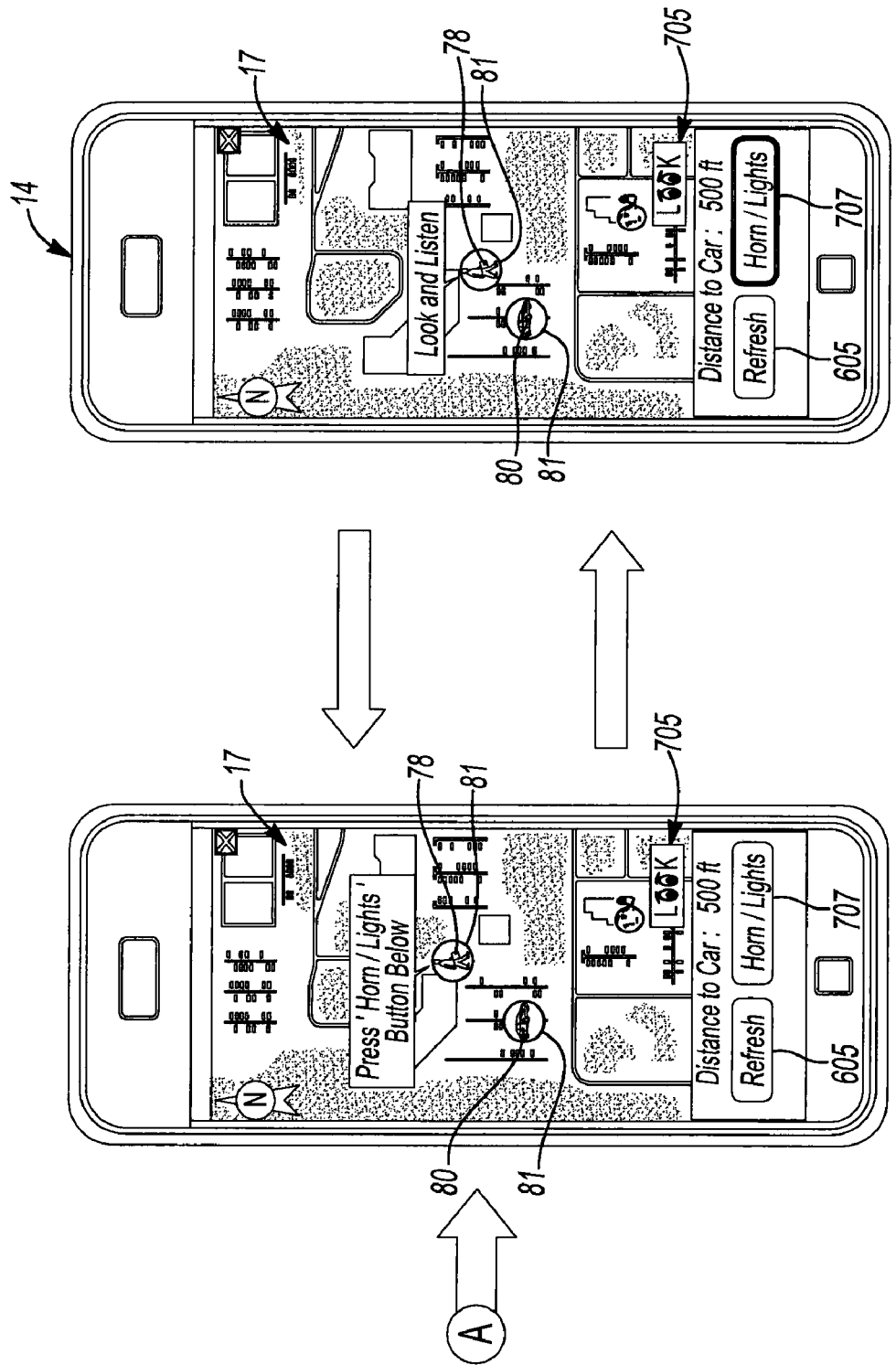

CAR FINDER BY CELL PHONE

CROSS-REFERENCE TO RELATED APPLICATIONS

This application claims the benefit of U.S. Provisional Application No. 61/099,740, filed on Sep. 24, 2008. The entire disclosure of the above application is incorporated herein by reference.

FIELD

The present disclosure relates to a system for locating a vehicle, and more specifically, to a system for locating a vehicle and displaying the vehicle location and a user location on a hand-held device, such as a cell phone.

BACKGROUND

This section provides background information related to the present disclosure which is not necessarily prior art. People often park and leave vehicles and subsequently forget where the vehicle is parked or how to navigate from their current location to the location of their vehicle. Such a situation can be a waste of one's time, a security concern, and/or a source of frustration. In other situations, a first person may park and leave the vehicle that a second person needs or wants to locate. The first person may fail to communicate the location of the vehicle to the second person and/or fail to provide navigable directions to the vehicle. In such a situation, the second person may face security risks and/or inconveniences if he or she is unable to readily locate the vehicle.

Currently, if a user, such as a vehicle owner, owns a vehicle with a remote access and/or security service that can be accessed through an Internet-capable cell phone, and the user desires to know where his or her car is geographically parked, he or she may access the remote-access service via a cell phone to view a map showing the location of the vehicle. Such a system is not without its share of limitations.

One such limitation of a current system is that such systems do not show the location of the user, relative to the vehicle, on the same screen. Furthermore, the map may not be displayed in a zoom level to permit a user to precisely locate his or her parked vehicle.

SUMMARY

This section provides a general summary of the disclosure, and is not a comprehensive disclosure of its full scope or all of its features. The present disclosure presents an interface option for a hand-held device with a display screen. More specifically, the disclosure presents a device, system and method for a user, such as a vehicle driver, for example, to locate his or her vehicle wherever the vehicle may be parked or otherwise located. Moreover, the teachings may permit a hand-held device or computing device to display the geographical location or position of the driver and the vehicle. The hand-held device may be a cell phone, such as, for example, an iphone® (manufactured by Apple, Inc.) or a Blackberry® (manufactured by Research in Motion Limited). Alternatively, the hand-held device may be a dedicated global positioning system (GPS) device, a personal digital assistant (PDA), an ipod® (manufactured by Apple, Inc.), a laptop computer, a hand-held computer, or any other portable electronic device. The hand-held device may utilize geographical location information that is available to a cell phone and/or Internet-capable device. In other words, the hand-held device may receive the geographical information, such as by downloading via the Internet or reception via a cellular network, so that the geographical information may be displayed on the display screen. The hand-held device may display on a map, the real-time or present locations of the vehicle and a user (such as the owner or driver of the vehicle, for example), who may be trying to locate the vehicle.

For example, a communication device on-board the vehicle, such as an on-board remote access system, security system, navigation system, or other communication device, may provide a location of the vehicle to the hand-held device, which may subsequently provide a viewable map on the hand-held device. Optionally, the map may permit a user to obtain a "street-level" view of the location, to aid the user in finding a parked vehicle. Such a street-level map may identify a particular road, cross-roads, and/or a precise street address location at or in the proximity of the vehicle and/or user, for example. Such street address information may be particularly helpful when a person searching for a vehicle is not the person who parked the vehicle, such as in the situation of a shared family vehicle, a fleet company pool car, or a stolen vehicle, for example.

There are a variety of embodiments of the invention. In some embodiments, a portable electronic device, such as a cell phone, may receive GPS-supplied position data from the vehicle, such as from the vehicle's navigation system, when the vehicle is locked after the driver turns off the engine. Such a system may utilize a wireless communication method. Additionally or alternatively, the wireless device with the capability to connect to the Internet, or a wireless service, such as On-Star® (by General Motors Corp.), and the ability to access remote-location information about a vehicle via the Internet connection. Additionally or alternatively, the wireless device may include an integrated GPS device, or other means of obtaining precise data about its own location. Additionally or alternatively, the system may employ a remote access system in which the vehicle's GPS information may be communicated to a server, which the user may subsequently access.

In one form, the present disclosure provides a system for locating a vehicle, which may include a hand-held device and a communication device on-board the vehicle. The hand-held device may include a screen, and may be adapted to import a map and display a present location of the hand-held device on the map. The communication device on-board the vehicle may be adapted to communicate a present location of the vehicle to the hand-held device. The hand-held device may be capable of displaying the location of the vehicle and the location of the hand-held device on the map at the same time.

In another form, the present disclosure provides a system for locating a vehicle, which may include a server, a first global positioning device, and a hand-held device. The first global positioning device may be in remote communication with the server. The first global positioning device may be adapted to determine a location of the vehicle and communicate the location of the vehicle to the server. The hand-held device may include a processor, a screen, and a second global positioning device integrated therein, and may be adapted for remote communication with the server. The second global positioning device may be adapted to determine a location of the hand-held device. The screen may be adapted to display a map. The location of the vehicle and the location of the vehicle and the location of the hand-held device are displayed on the map together.

In yet another form, the present disclosure provides a method for locating a vehicle that may include receiving a location of the vehicle into a hand-held device, determining a location of the hand-held device, and displaying a map on the hand-held device. The map may include indicia of the location of the vehicle and the location of the hand-held device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a block diagram of a vehicle locating system according to the principles of the present disclosure;

FIG. 2 is a block diagram of another embodiment of the vehicle locating system according to the principles of the present disclosure;

FIG. 3 is a schematic representation of a map generated by the vehicle locating system;

FIG. 9 is a flowchart depicting a scenario of operation of an embodiment of the software of the vehicle locating system according to the principles of the present disclosure;

FIG. 15A is another schematic representation depicting a scenario of output of the vehicle locating system displayed on the hand-held device;

Corresponding reference numerals indicate corresponding parts throughout the several views of the drawings.

DETAILED DESCRIPTION

Figure 4:
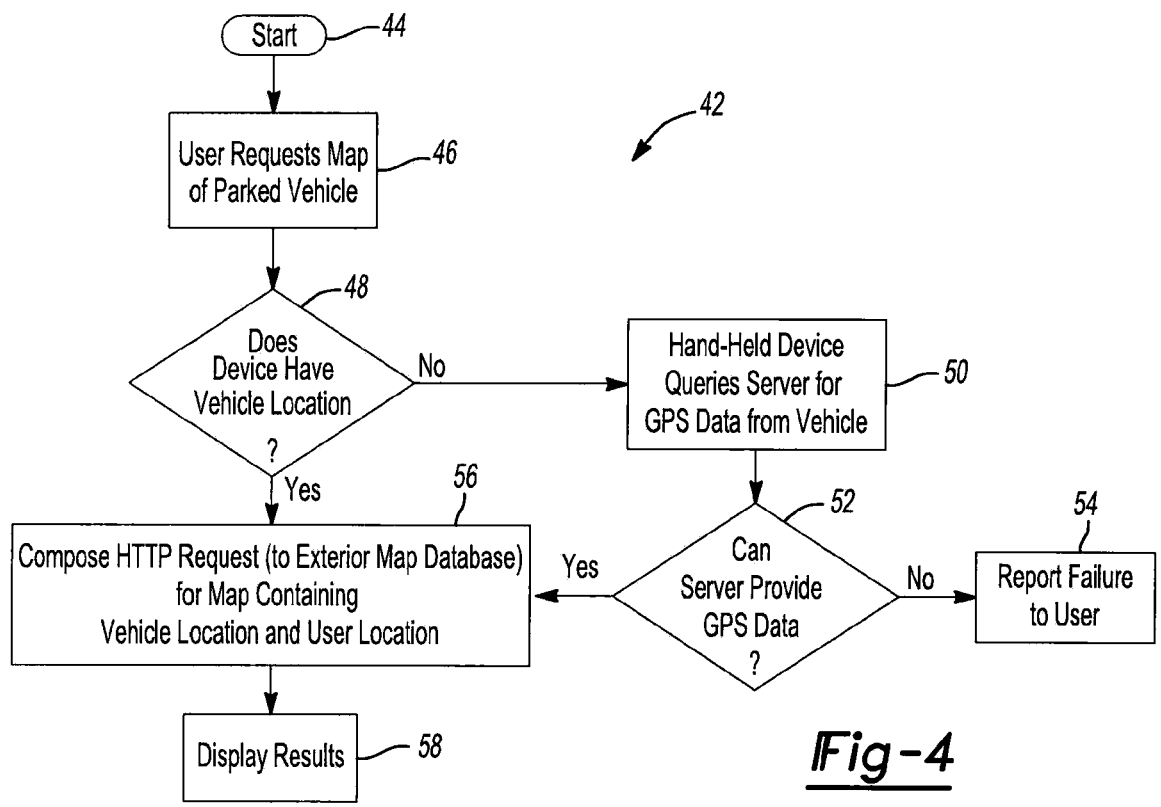
FIG. 4 is a flowchart illustrating a scenario of operation of an embodiment of the vehicle locating system according to the principles of the present disclosure.

Example embodiments will now be described more fully with reference to the accompanying drawings. With reference to FIGS. 1-17, a vehicle locating system 10 is provided, and may include a communication system 12 and a hand-held device 14. The communication system 12 may be disposed within, integrated into, or otherwise located on-board a vehicle 16. The system 10 may be operable to display a map 17 indicating a location of the vehicle 16 and a location of the hand-held device 14 (which may be carried by a user), such that the user may be directed to the location of the vehicle 16.

Figure 6:
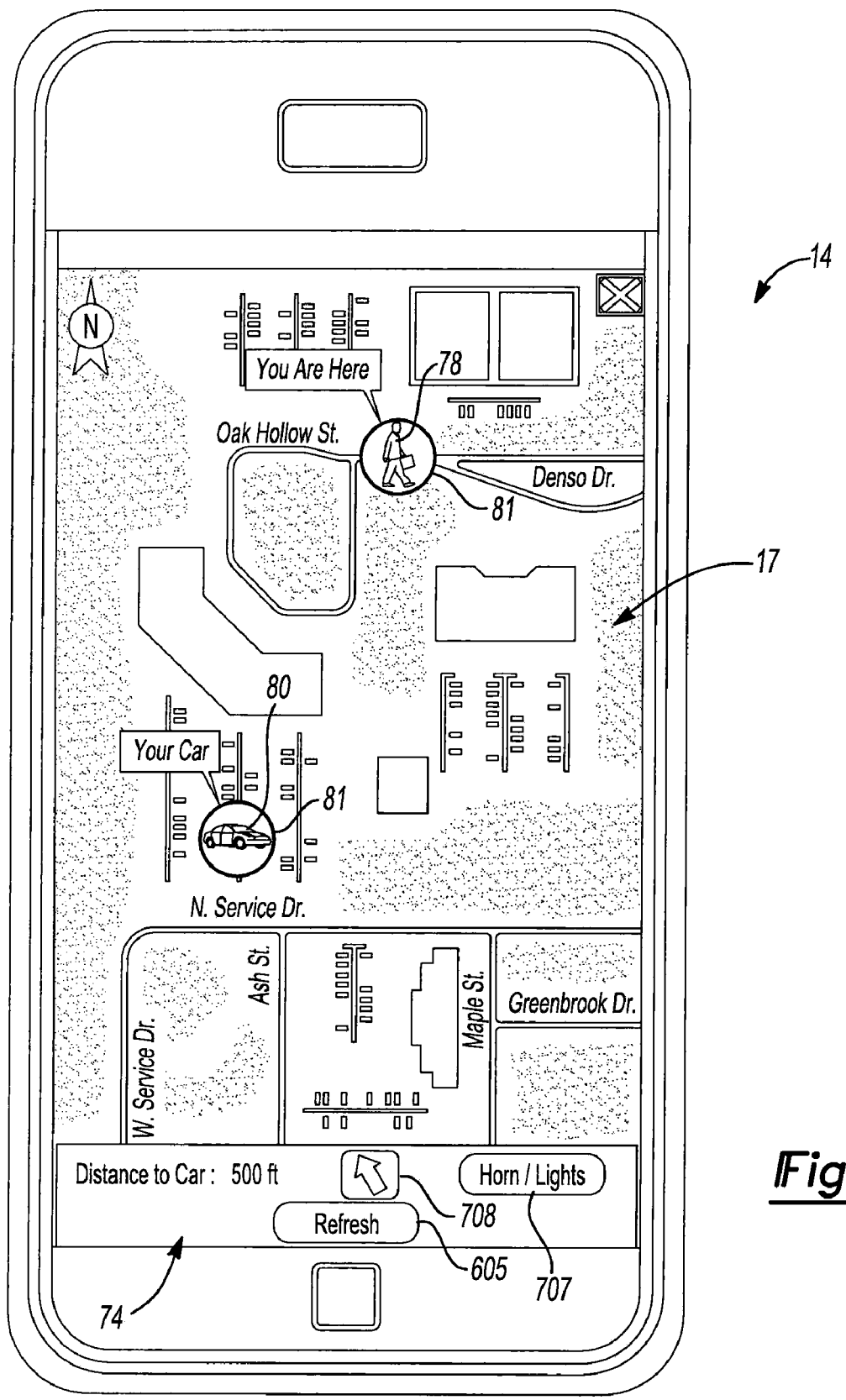
FIG. 6 is a schematic representation of a map displayed on the hand-held device according to the principles of the present disclosure.
Figure 8:
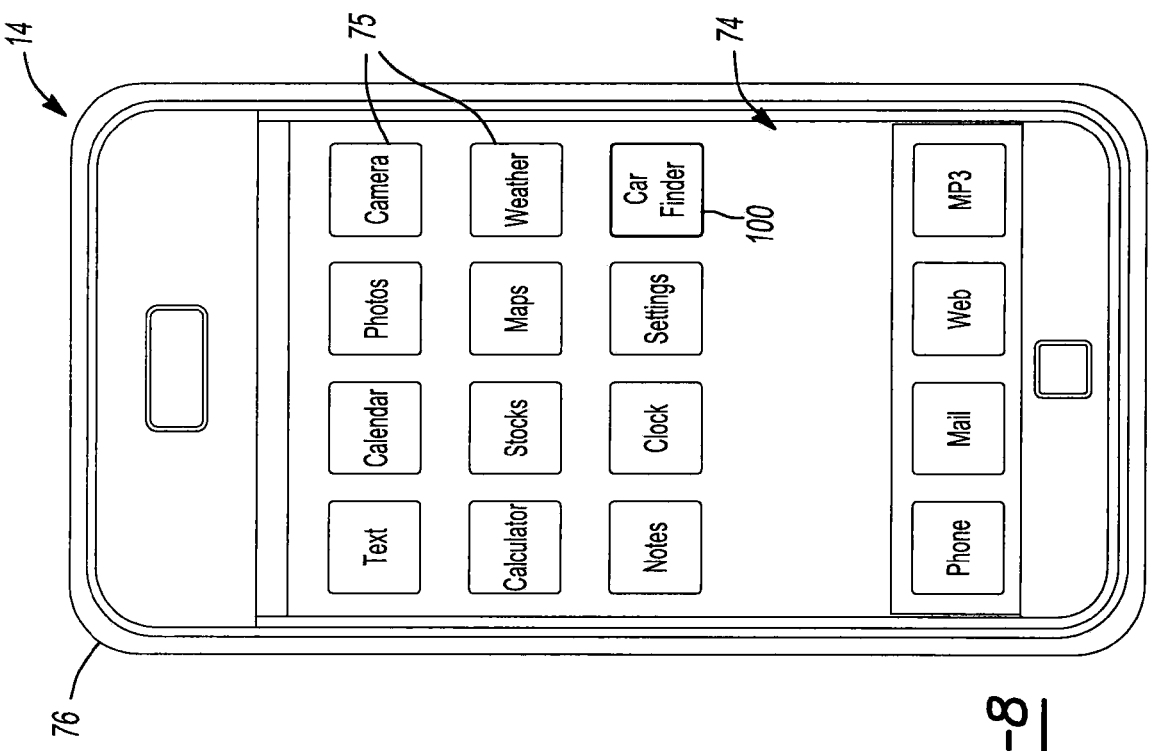
FIG. 8 is a schematic representation of the hand-held device according to the principles of the present disclosure.
Figure 15:
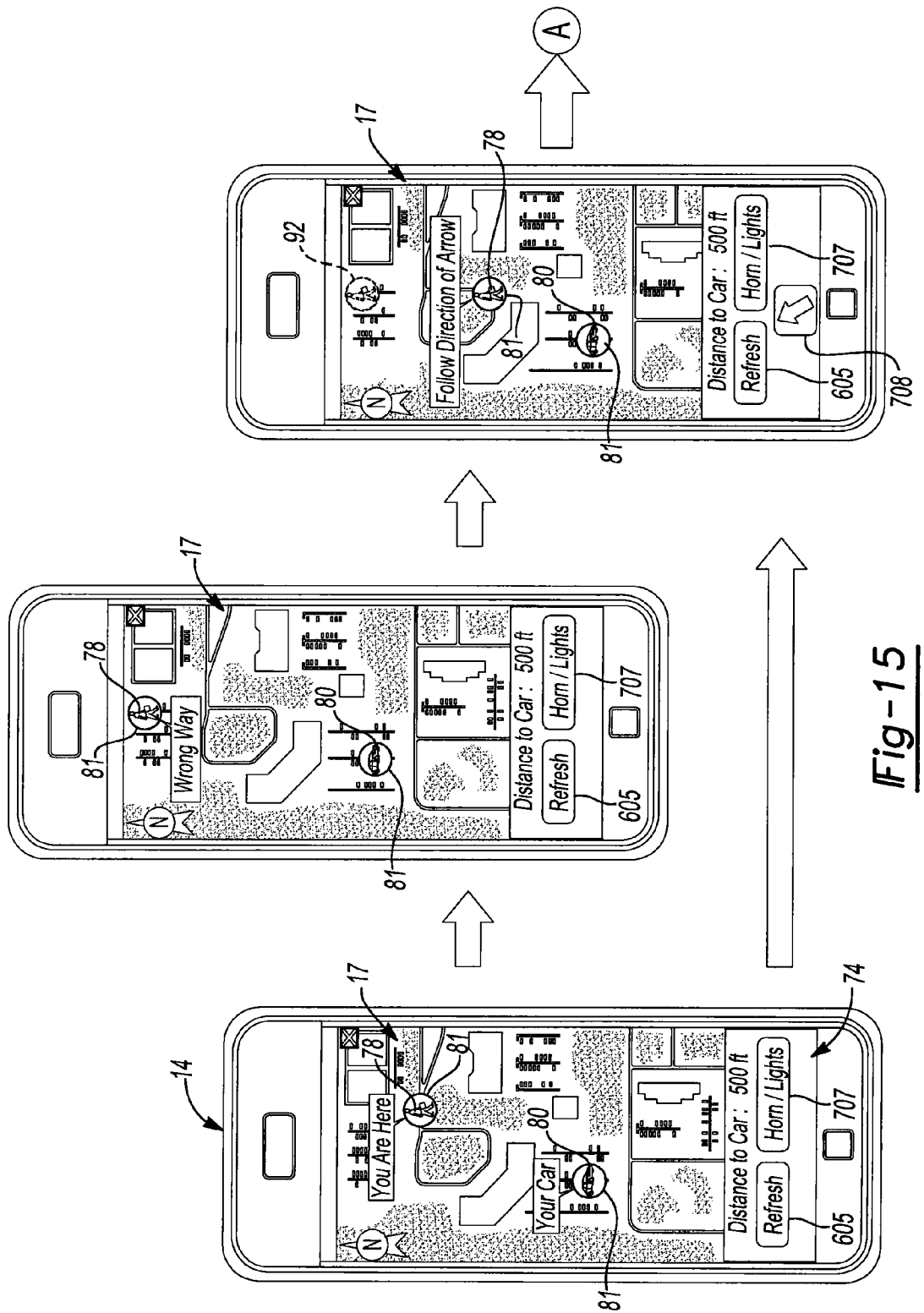
FIG. 15 is a schematic representation depicting a scenario of output of the vehicle locating system displayed on the hand-held device.

Referring now to FIG. 1, the communication system 12 may include a GPS device, and may include or comprise a portion of an on-board remote access system, security system, navigation system, or other communication device. The communication system 12 may be in communication with the hand-held device 14, which may be capable of accessing and communicating with the Internet. The hand-held device 14 may be a cell phone, such as, for example, an iphone® or a Blackberry®. Alternatively, the hand-held device may be a dedicated GPS device, a personal digital assistant (PDA), an ipod®, a laptop computer, a hand-held computer, or any other portable electronic device. As shown in FIGS. 6, 8 and 15, the hand-held device 14 may include a screen 74 and user input means 75, such as a touch screen interface, buttons and/or voice command module, for example. The hand-held device 14 may include embedded code or software operable to determine and display the location of the vehicle 16 and hand-held device 14, as will be subsequently described.

The hand-held device 14 and the communication system 12 may be in bilateral communication with each other (via Bluetooth® transmitters/receivers or other RF communication devices, for example) and/or the Internet 20, as indicated by arrows 18, 19, 22, 24. The location of the vehicle 16 may be uploaded to the server 28 and/or downloaded to the hand-held device 14 when the vehicle engine or propulsion source is turned off and/or the vehicle door is locked, for example. Thus, the server 28 and/or hand-held device 14 may have the geographic location of the vehicle stored in memory. It should be appreciated, however, that in some embodiments, the location of the vehicle 16 may be downloaded to the hand-held device 14 at any time, regardless of the operating condition of the vehicle's propulsion source or door locks. For example, the hand-held device 14 may receive the location of the vehicle 16 intermittently or continuously.

The hand-held device 14 may communicate with the Internet 20 to access map data, such as a road or street map, or even satellite pictures at the street level or any level above the surface of the earth. Thus, with the vehicle communication system 12 downloading or directing information into the hand-held device 14, the position of the vehicle on a map may be displayed on the screen 74. Additionally, the location of the hand-held device 14, which may be held by the user, may be displayed on the same screen and using the same map. Thus, on the same map on the screen of the hand-held device 14, the location of the driver holding the hand-held device 14 and the location of the vehicle 16 may be displayed, and the to-scale relative distance between the hand-held device 14 and the vehicle 16, may be depicted.

Turning now to FIG. 2, the hand-held device 14 may communicate with a remote access/security server 28 in accordance with arrow 30 and arrow 32. Additionally, the remote access/security server 28 may communicate with the Internet 20 in accordance with arrow 34 and arrow 36. The remote access/security server 28 may also be in communication with the communication system 12 of the vehicle 16 in accordance with arrow 38 and arrow 40.

FIG. 3 depicts the map 17 which may include a road map, a satellite image, and/or a picture from above an area that may be used to help the user locate the vehicle 16. For example, "B" may indicate the location of the user or the person searching for the vehicle 16, while "A" may indicate the location of the vehicle 16. The user may be able to reach the vehicle 16 by traversing a route along a sidewalk or a street. Additionally or alternatively, the user may determine from the map 17 that the fastest or most direct route to the vehicle 16 may include a shortcut through a building, across a field, and/or another off-road route.

Referring now to FIG. 4, a flowchart 42 depicts a scenario of operation of an embodiment of the system 10. The logic begins at start bubble 44 and progresses to block 46 where a user may request, via the hand-held device 14, the map 17 revealing the location of the vehicle 16. Continuing to decision block 48, the logic inquires whether the hand-held device 14, has received the location of the vehicle 16. If the reply is "yes" the logic continues to block 56, which will be explained shortly. If the reply is "no" the logic may proceed to block 50 where the hand-held device 14 may query the server 28 for GPS data from the vehicle 16 to reveal the location of the vehicle 16. At decision block 52 the logic may inquire whether the server can provide GPS data. If the reply is "no" the logic may proceed to block 54 where failure may be reported to the user, i.e., an error message may be displayed on the screen 74. If the reply is "yes" the logic may proceed to block 56. At block 56, an HTTP request is composed (to the exterior map database) for a map containing the vehicle location and the user location. Upon compiling such a request, the logic proceeds to block 58, where the results are displayed on the hand-held device 14 such that the location of the vehicle 16 and the location of the hand-held device 14 are both depicted on the map 17.

Figure 5:
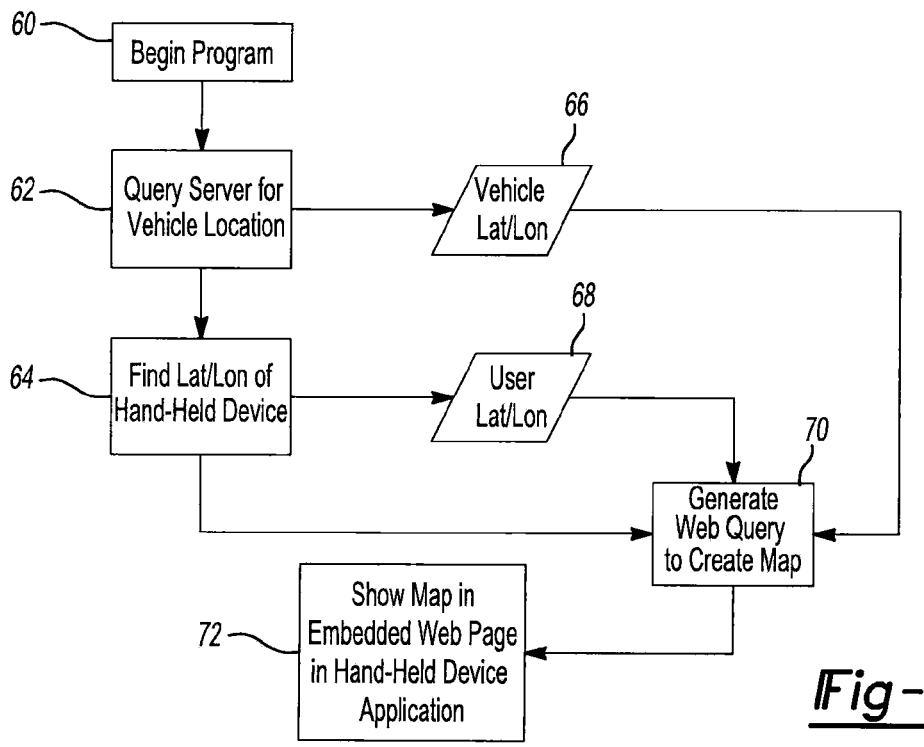
FIG. 5 is a flowchart illustrating the logic of an embodiment of software embedded in a hand-held device according to the principles of the present disclosure.

With reference to FIG. 5, an example of code design or logic flow for an embodiment of the system 10 will be explained. At block 60 the user may start operation of the system 10 via the user input means 75 (FIG. 8). At block 62, the server 28 may be queried for the location of the vehicle 16. The location of the vehicle 16 may be stored as data at block 66. The location of the vehicle 16 may include its latitude and longitude. As the logic continues at block 64, the latitude and longitude of the hand-held device 14 may be calculated and stored as the latitude and longitude of the user. At block 70, the latitudes and longitudes of the vehicle 16 and the hand-held device 14 may be used to generate a web query to create the map 17 (FIG. 3), which may include a three-dimensional image, satellite map or a traditional two-dimensional road map. The logic may then flow to block 72, where the map 17 is displayed on the hand-held device 14 as an embedded Web Page, such as in an iphone® Application, for example. With the software code designed in such a manner, the software may utilize car location provided by the communication system 12, iphone® technology that can report its own location via a GPS device, and custom maps that generate scripts, such as provided by Google™.

Turning to FIG. 6, the display design will be discussed. More specifically, the display or screen 74 of the hand-held device 14 may display the map 17 including a user icon 78 and a vehicle icon 80. The position of user icon 78 on the screen 74 may correspond to the location of the hand-held device 14 (or the user). The position of the vehicle icon 80 on the map 17 may correspond to the location of the vehicle 16. The user icon 78 and the vehicle icon 80 may include accuracy indicators 81, which may be circles surrounding the icons 78, 80. The area of the map 17 occupied by the accuracy indicators 81 may correspond to the relative (to scale) accuracy or margin of error of the GPS device associated with the communication system 12 or hand-held device 14. Accordingly, the actual precise location of the vehicle 16 or hand-held device 14 may be anywhere within the area encompassing the accuracy indicator 81 associated with the vehicle icon 80 or user icon 78, respectively. Additionally, a zoom feature may be provided to allow the user to better see details of the route between the location of the hand-held device 14 and the location of the vehicle 16. One or more of the accuracy indicators 81 may change color or otherwise change its appearance in response to one or more of a plurality of conditions. Such conditions may include, for example, the user moving away from the vehicle 16, the user entering an area within a predetermined distance from the vehicle 16, a change of the location of the vehicle 16, or other conditions.

The screen 74 may also include a horn/lights button or touch screen interface unit 77. As will be subsequently described, the user may press the horn/lights button 707 to actuate the horn and/or headlights of the vehicle 16. It will be appreciated that the horn/lights button 707 may additionally or alternatively be pressed to actuate an alarm, hazard lights, and/or interior lights of the vehicle, for example. Additionally or alternatively, the screen 74 may include indicators, such as markers, icons, an arrow and/or text, to indicate a distance and/or a direction that the user must move in order to arrive at the location of the vehicle 16. For example, an arrow 708 may point in a direction (to North on the map 17 in which the user must move to arrive at the vehicle 16. Alternatively, the hand-held device 14 may be configured such that the arrow 708 points in the actual direction in which the user must move relative to the direction and/or angle at which the user is holding the hand-held device 14 (i.e., the direction of the arrow 708 may not relative to North).

Figure 7:
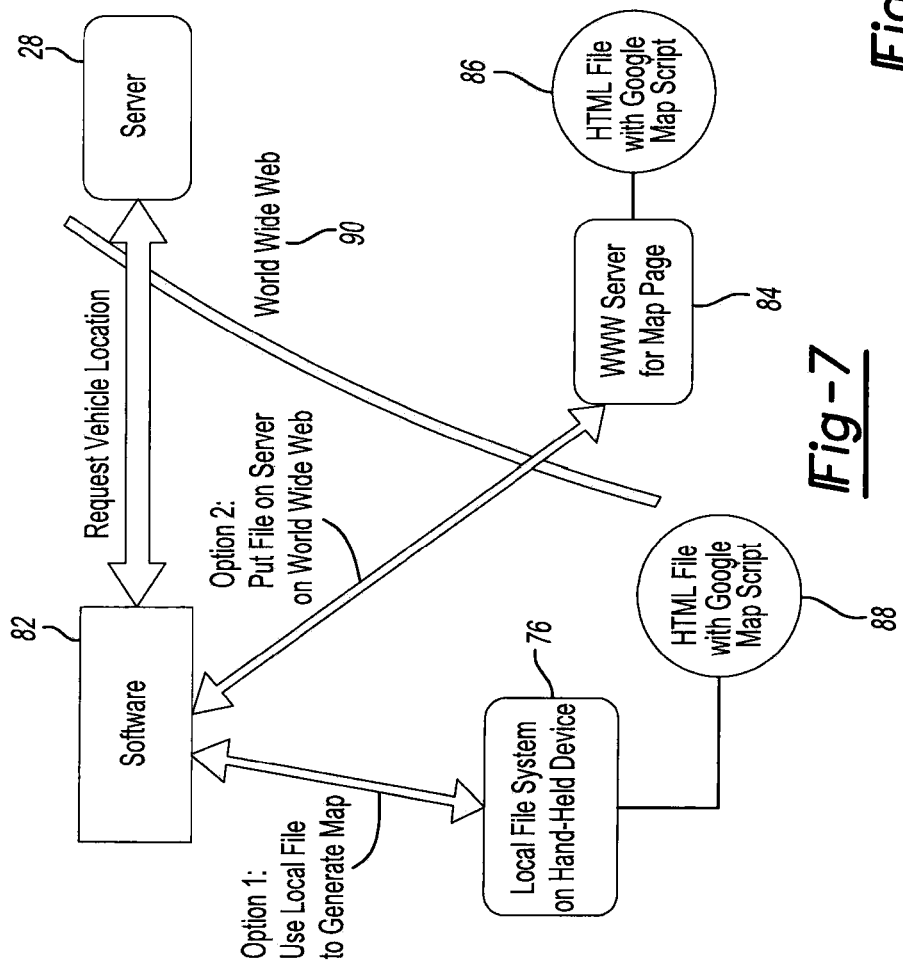
FIG. 7 is a block diagram of an embodiment of the vehicle locating system according to the principles of the present disclosure.

Referring now to FIG. 7, the creation of the map 17 to be used on the screen 74 will be discussed in more detail. Software 82 embedded in the hand-held device 14 may utilize one or more of a plurality of means to generate the map 17. The software 82 may incorporate JavaScript® (by Sun Microsystems, Inc.) and Google™ Maps API technology to generate the map 17 to display on the screen of the hand-held device 14. Data may be gathered by a program written in Objective-C® (by Apple, Inc.) for use on an iphone®, for example.

For example, a first means of creating the map 17 may utilize a local hypertext markup language (HTML) page. In so doing, the script may obtain data from Google™ Maps, and the results may be displayed on the screen of the hand-held device 14. The location of the vehicle 16 and the location of the hand-held device 14 may be embedded directly in a script file before a page, such as a web page, is opened by a browser.

A second means of creating the map 17 is to place HTML on a server visible on the World Wide Web. Furthermore, the Script obtains data from Google™ Maps, and both locations, that is, the location of the vehicle 16 and the location of the hand-held device 14 must be sent to the script in the request. It should be appreciated that while the first and second means are described above as obtaining map data from a server 84 or HTML page associated with the Google™ Maps website, any other server, HTML page, website or database operable to generate map data may be utilized. Further, while the software 82 is described above as incorporating JavaScript® and/or Objective-C®, it will be appreciated that the software can be based on or incorporate other languages.

It should be appreciated that in some embodiments, the hand-held device 14 may not need to access map data via a remote server or other source. For example, the hand-held device 14 may generate the map 17 from map data that has been previously stored or loaded into an integral memory unit of the hand-held device 14.

The software 82 may conduct bilateral communications with the server 28 associated with the communication system 12, the server 84 associated with the map-generating website, and a local file system 76 on the hand-held device 14. The server 84 may be in communication with the HTML file with map script 86, while the local file system on the hand-held device 14 may be in communication with the HTML file with a map script 88. There may be one or more HTML files with map scripts 86, 88.

The software 82 may request the location of the vehicle 16 from the server 28, which may be in communication with the World Wide Web 90. The software 82 may be in communication with the local file system 76 on the hand-held device 14 to generate the map 17. Alternatively, the software 82 may be in communication with the server 84 to generate the map 17.

FIG. 8 depicts an example of what may be displayed on the screen 74 of the hand-held device 14. More specifically, an icon 100 may be resident on the screen such that when it is pressed or touched, the software 82 of the system 10 may operate. Upon pressing or touching the icon 100, the map 17 may be displayed on the screen 74. The map 17 may then display the user icon 78 (corresponding to the location of the hand-held device 14) and the vehicle icon 80 (corresponding to the location of the vehicle 16).

With reference to FIGS. 9-17, additional modes of operation of the system 10 will be described. Some or all of these embodiments may incorporate the hand-held device 14, a server such as the server 28 and/or 84 described above, for example, and a script operable to generate the map 17 and display the map 17 on the screen 74 of the hand-held device 14. The software 82 may be stored in the hand-held device 14 and may be executable thereon. The server may provide the location of the vehicle 16, the location of the hand-held device 14, and/or map data. The server may also include a script to update the locations and/or the accuracy of the locations.

Turning now to FIG. 9, a flowchart 200 depicts a scenario of operation of an embodiment of the software 82 of the system 10. The logic begins at start bubble 202 and progresses to block 204 where a start screen may be displayed on the screen 74 of the hand-held device 14. As indicated at block 206, the start screen may provide the user with an option to select "Settings" to customize settings of the hand-held device 14 and/or system 10 or "Map" to display the map 17. If the user selects "Map", the logic may proceed to block 208, which will be subsequently described. However, if the user chooses "Settings," the logic may proceed to block 210, where the user may customize one or more of a plurality of customizable system settings. Such customizable settings may include, for example, volume, customizable sounds or tones, color, size and/or font of text and/or the map 17, features to be displayed on the map 17 and/or screen 74, network connectivity settings, selecting an identity of the particular vehicle to be located from a list of a plurality of vehicles, and/or any other settings. At block 212, the user may select "Done" or "Cancel." If the user selects "Done," the logic may proceed to block 214, where any changes to the settings may be saved. At block 216, the software 82 may return to the start screen at block 204. If the user selects "Cancel" at block 212, any changes to the settings may not be saved, and the logic may proceed to block 216, where the software 82 may return to the start screen at block 204.

As described above, if the user selects "Map" at block 206, the logic may proceed to block 208, where the hand-held device 14 may send a request to the server for the location of the hand-held device 14 and the location of the vehicle 16. The locations of the hand-held device 14 and vehicle 16 may be obtained from a location data file at block 210. While the request for locations is being processed, a status page may be displayed on the screen 74, at block 212, which may include a message to the user that the system 10 is acquiring the locations of the hand-held device 14 and vehicle 16.

At block 214, the software 82 may check for an improvement to the accuracy of the location data. If such an improvement exists, the logic may proceed to block 216, where the improvement may be sent to the server for storage in the location data file at block 210, and the map 17 may be displayed at block 218 including the location improvement. At block 220, the may sleep for 0.5 seconds, for example, and loop back to block 214.

If, at block 214, an improvement to the accuracy of the location data is not found, the logic may proceed to block 222, where the software 82 may check for a location update including new location data for the vehicle 16 and/or hand-held device 14. If no updated location data is found, the logic may proceed to block 224, where the program may sleep for 0.5 seconds, for example, and loop back to block 222 to check again for new location data. If updated location data is found at block 222, the logic may proceed to block 226, where the updated location data may be sent to the server for storage in the location data file at block 210. The map 17 may be displayed on the hand-held device 14 at block 228 including the location update of the hand-held device 14 and/or vehicle 16. The software 82 may then proceed to block 224 and loop back to block 222. The software 82 may repeat the above steps until the user has arrived at the vehicle 16 or otherwise ends the program.

Figure 10:
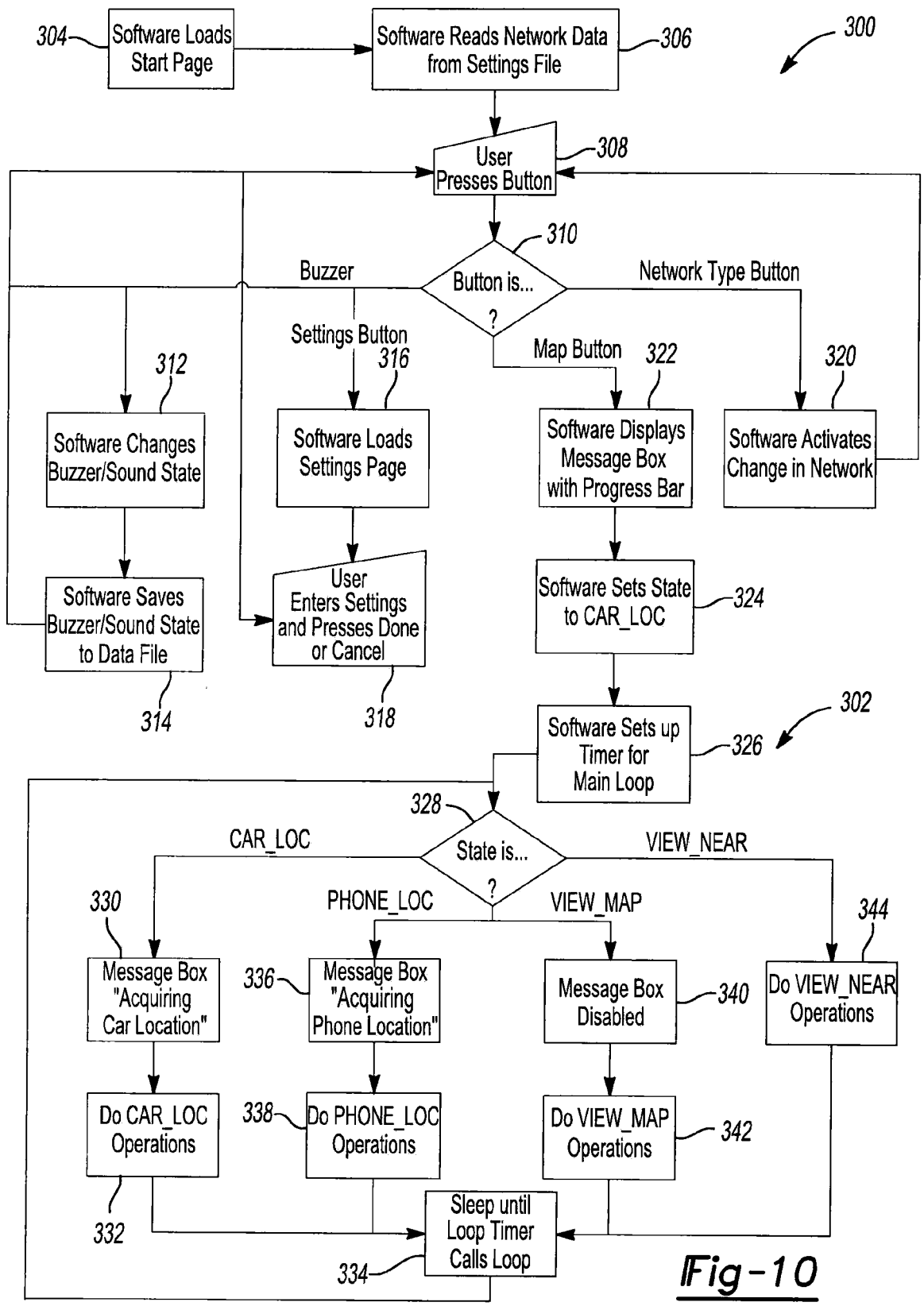
FIG. 10 is a flowchart depicting a scenario of operation of another embodiment of the software of the vehicle locating system according to the principles of the present disclosure.

Referring now to FIGS. 10-15, another embodiment of the software 82 will be described. Turning first to FIG. 10, a flowchart 300 provides a scenario of operation of the software 82 including a main loop 302. The main loop 302 may include a CAR_LOC subroutine 400, a PHONE_LOC subroutine 500, a VIEW_MAP subroutine 600, and a VIEW_NEAR subroutine 700. The CAR_LOC subroutine 400 may determine the location of the vehicle 16. The PHONE_LOC subroutine 500 may determine the location of the hand-held device 14. The VIEW_MAP subroutine 600 may generate the map 17. The VIEW_NEAR subroutine 700 may prompt the user to activate the horn and lights of the vehicle 16. The main loop 302 may be continuously or intermittently repeated and may run one of the CAR_LOC subroutine 400, the PHONE_LOC subroutine 500, the VIEW_MAP subroutine 600, and the VIEW_NEAR subroutine 700, depending on a state set by the software 82, as will be subsequently described.

The logic of the flowchart 300 begins at block 304, where the software 82 may load and displays the start page on the hand-held device 14. At block 306, the software 82 may read network data from a settings file. At block 308, the user may press or touch one of a plurality of buttons or touch screen interface units. At block 310, the software 82 may determine whether the button that was pressed was a "Buzzer" button, a "Settings" button, a "Map" button, or a "Network Type" button. If the button pressed is the "Buzzer" button, the logic may proceed to block 312, where tones and other sounds produced by the software 82 may be changed and/or the volume may be adjusted or muted. At block 314, any sound changes may be saved to a data file. From block 314, the start page may be displayed, and the software 82 may loop back to block 308.

If the button pressed at block 308 is the "Settings" button, the logic may proceed from block 310 to block 316, where the software 82 may load the settings page. At block 318, the user may customize settings (such as the setting described above) and press "Done" to save the changes and exit the setting page or "Cancel" to cancel the changes and exit the settings page. The software 82 may then loop back to block 308.

If the button pressed at block 308 is the "Network Type" button, the logic may proceed from block 310 to block 320, where the software 82 may initiate a change in network connectivity. For example, the network type could be changed from a 3G network to a local Wi-Fi network. From block 320, the software may loop back to block 310.

If the button pressed at block 308 is the "Map" button, the logic may proceed from block 310 to block 322, where the software may display a message box with a progress bar indicating to the user that the system 10 is acquiring the map 17 and the locations of the hand-held device 14 and the vehicle 16. The logic may then proceed to block 324, where the software 82 may set the state to CAR_LOC. The logic may then proceed to block 326, where the software 82 may set a timer for the main loop 302. The timer may dictate the intervals at which the main loop 302 may be repeated, as will be subsequently described.

The logic may then proceed to block 328, where the software 82 may determine whether the state is set at CAR_LOC, PHONE_LOC, VIEW_MAP, or VIEW_NEAR. Since the state was set to CAR_LOC at block 324, the logic may proceed to block 330, where the software 82 may display a message to the user that the system 10 is acquiring the location of the vehicle 16. This message may continue to be displayed until the location of the vehicle 16 is determined. Meanwhile, the logic may proceed to block 332, where the software 82 may run the CAR_LOC subroutine 400. After running the CAR_LOC subroutine 400, the logic may proceed to block 334, and the software 82 may sleep until the timer (set at block 326) loops the software 82 back to block 328, where the main loop 302 may be repeated.

Figure 11:
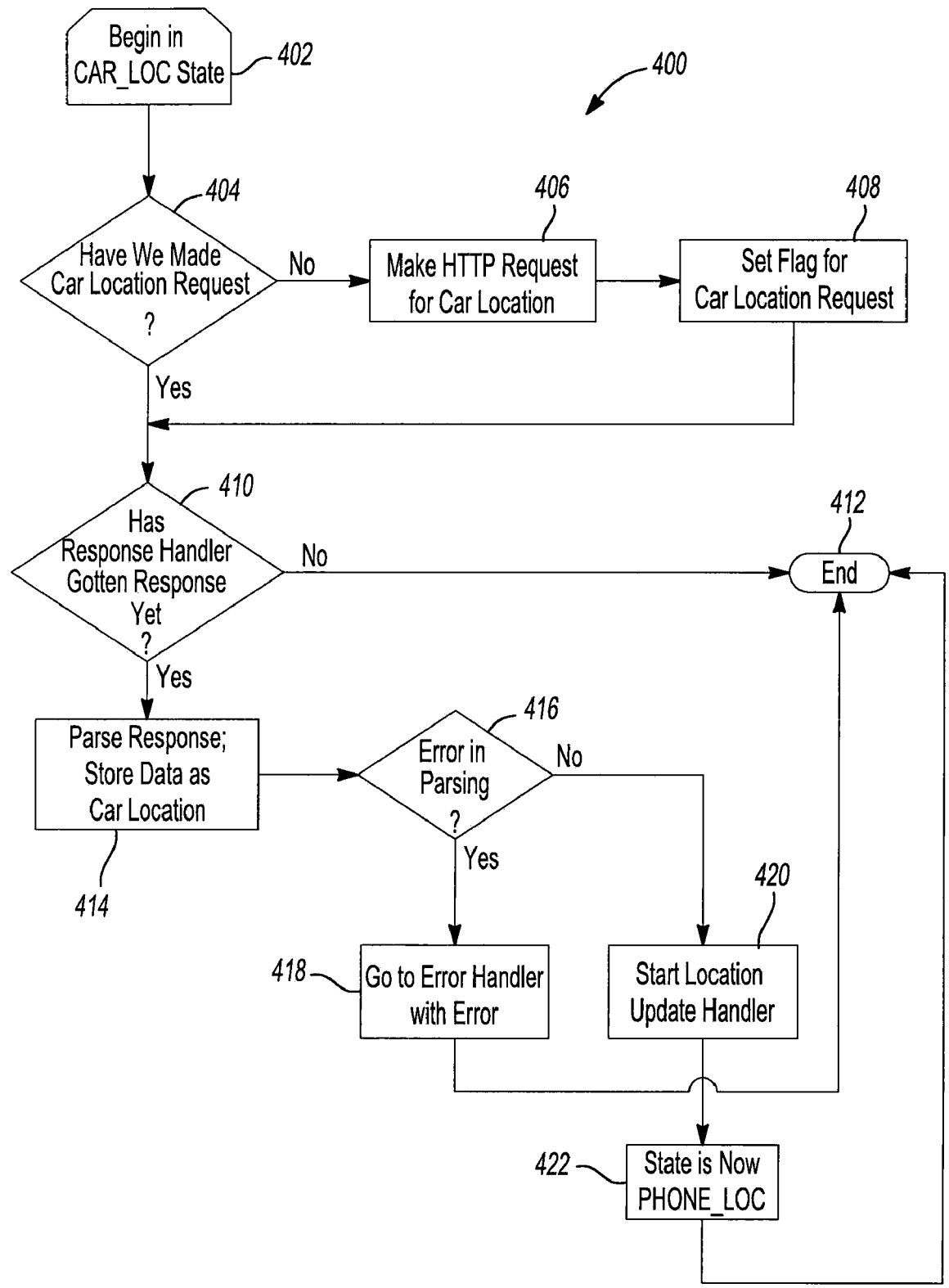
FIG. 11 is a flowchart depicting a scenario of operation of a CAR_LOC subroutine of the software of the vehicle locating system according to the principles of the present disclosure.

Referring now to FIG. 11, operation of the CAR_LOC subroutine 400 will be described. Beginning at block 402, the logic of the CAR_LOC subroutine 400 may proceed to block 404, where the software 82 determines whether a request has been sent to obtain the location of the vehicle 16. If a request has not been sent, the logic may proceed to block 406, where the software 82 may generate and send an HTTP (hypertext transfer protocol) request to the server for the location of the vehicle 16. At block 408, the software may set a flag indicating that the request for the location of the vehicle 16 has been made such that at block 404, the software may determine that the request has been made. Accordingly, once the request has been made, the logic may proceed to block 410, where the software 82 may determine whether the hand-held device 14 has received a response from the server providing the location of the vehicle 16. If the response from the server has not been received, the logic may proceed to block 412, where the CAR_LOC subroutine 400 may be ended. The software 82 may then exit the CAR_LOC subroutine 400 and proceed from block 332 to block 334 (FIG. 10). At block 334, the software may sleep, as described above, until the timer loops the software back to block 328. Since the state has not been changed, it may still be set to CAR_LOC, so the software 82 may proceed to block 330 (to display the message described above) and subsequently to block 332, to run the CAR_LOC subroutine 400.

At block 404, the request for the location of the vehicle 16 may have already been sent, so the logic may proceed to block 410. If the response from the server has still not been received, the logic may again proceed to block 412, where the steps described above may be repeated. However, if the response has been received from the server, the logic may proceed from block 410 to block 414, where the vehicle location data received from the server may be parsed and stored. At block 416, the software 82 may determine whether an error occurred in parsing the data from the server. If a parsing error occurred, the logic may proceed to block 418, and subsequently to block 412, where the CAR_LOC subroutine 400 may end, and the steps above may be repeated. However, if no parsing error occurs, the logic may proceed from block 416 to block 420, where a location update handler may be initiated. The location update handler may include a program to check for and process location updates and/or location accuracy improvements, and update the map 17 accordingly. From block 420, the logic may proceed to block 422, where the software 82 changes the state to PHONE_LOC and ends the CAR_LOC subroutine 400 at block 412.

Returning again to the main loop 302 depicted in FIG. 10, the software may sleep at block 334 and subsequently loop back to block 328, where the software 82 rechecks the state. As described above, the state may have been set to PHONE_LOC. In such as situation, the software may proceed from block 328 to block 336, where a message to user may be displayed on the screen 74 indicating that the system 10 is acquiring the location of the hand-held device 14. This message may continue to be displayed until the location of the hand-held device 14 is determined. Meanwhile, the logic may proceed to block 338, where the software 82 may run the PHONE_LOC subroutine 500. After running the PHONE_LOC subroutine 500, the logic may proceed to block 334, and the software 82 may sleep until the timer (set at block 326) loops the software 82 back to block 328, where the main loop 302 may be repeated.

Figure 12:
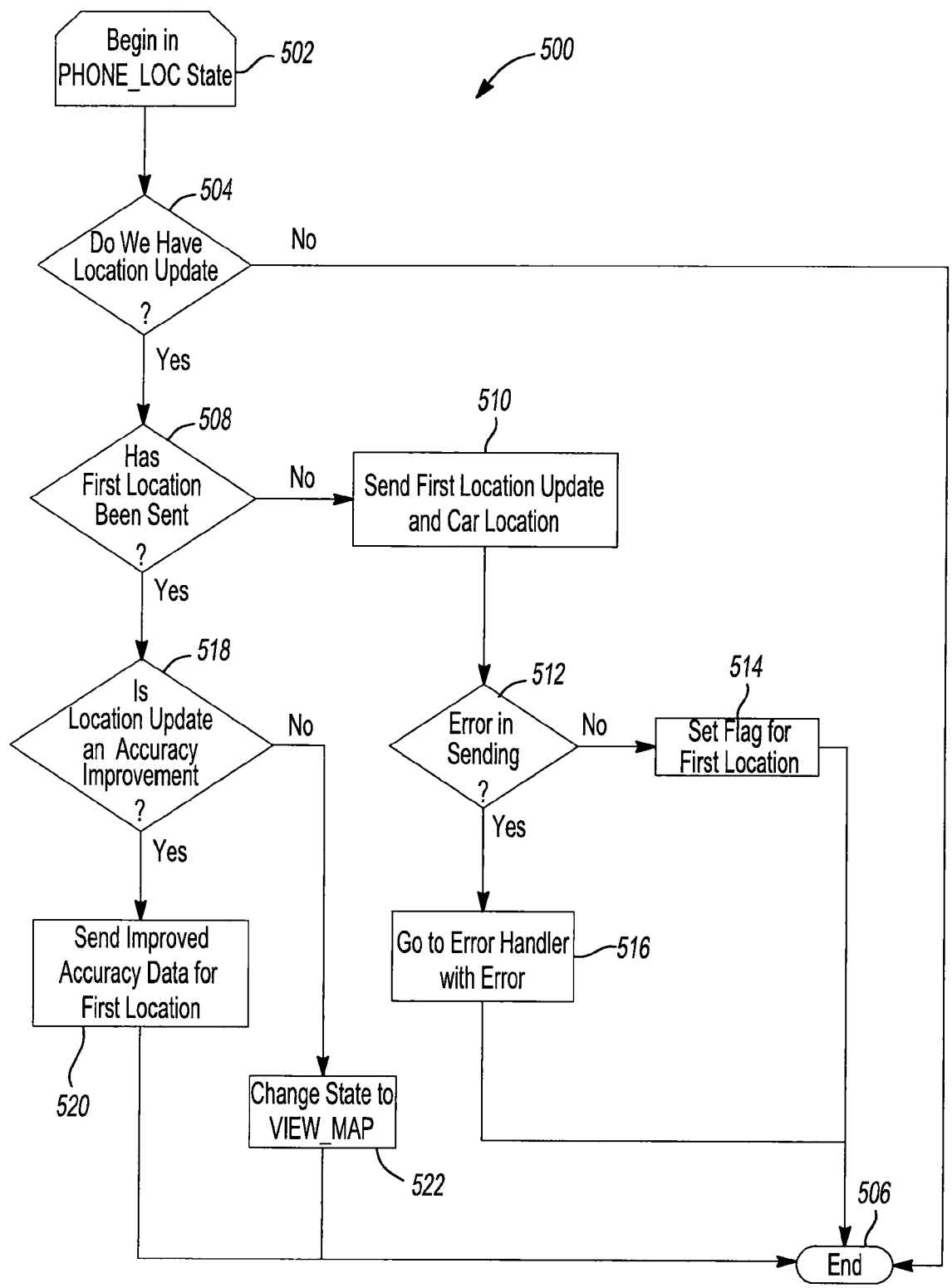
FIG. 12 is a flowchart depicting a scenario of operation of a PHONE_LOC subroutine of the software of the vehicle locating system according to the principles of the present disclosure.
Figure 13:
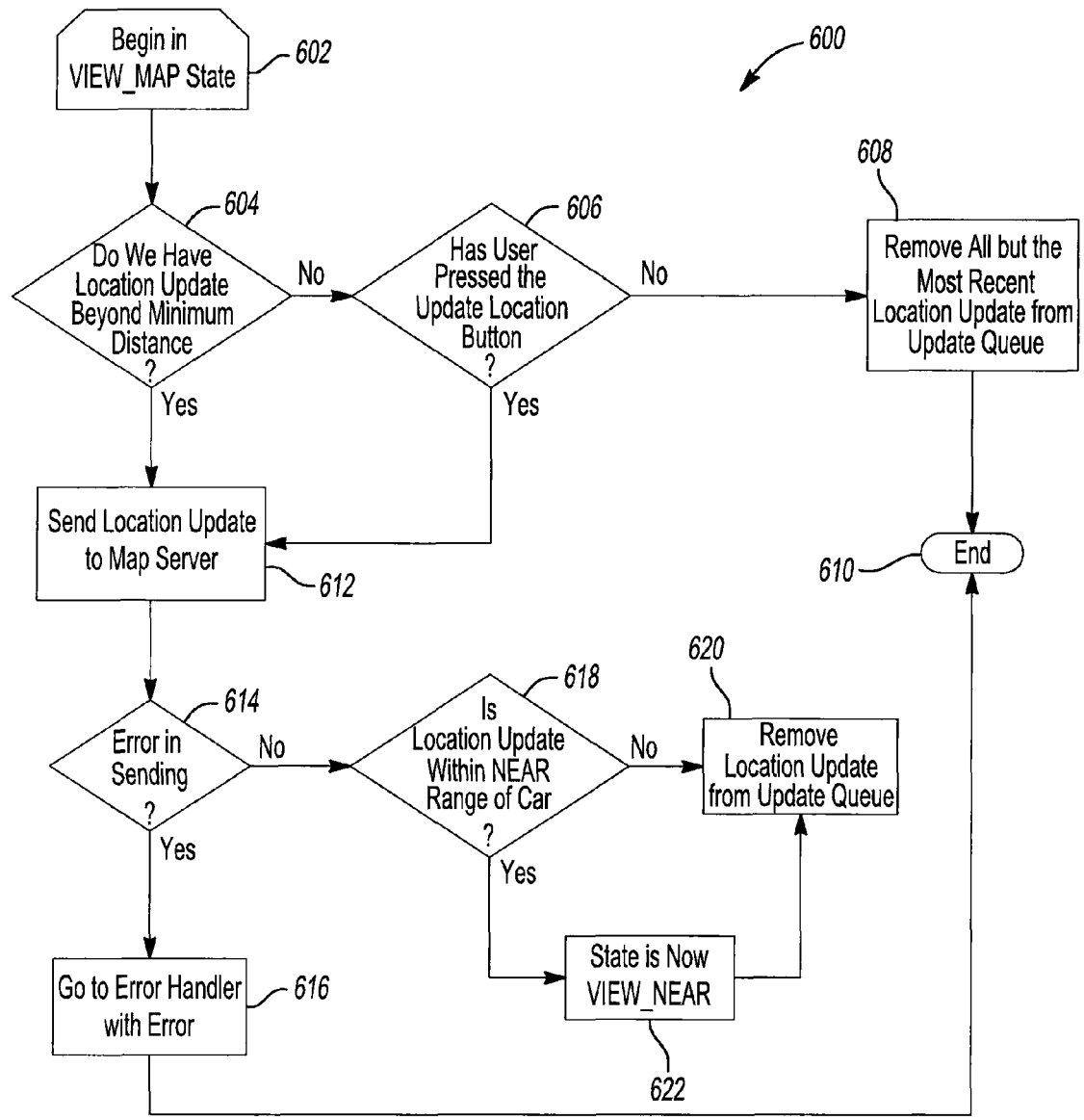
FIG. 13 is a flowchart depicting a scenario of operation of a VIEW_MAP subroutine of the software of the vehicle locating system according to the principles of the present disclosure.

Referring now to FIG. 12, operation of the PHONE_LOC subroutine 500 will be described. Beginning at block 502, the logic of the PHONE_LOC subroutine 500 may proceed to block 504, where the software 82 may determine whether the hand-held device 14 has received an update of its location from the server. If no update has been received, the logic proceeds to block 506, where the PHONE_LOC subroutine 500 may be ended. The main loop 302 may then cycle the software 82 back through blocks 328, 336 and 338, where the PHONE_LOC subroutine 500 may be run again.

If the updated location of the hand-held device 14 has been received from the server, the logic may proceed from block 504 to block 508, where the software 82 determines whether a first location data has been sent to the server. If the first location data has not been sent, the logic may proceed to block 510, where the first location update and the location of the vehicle 16 may be sent to the server. At block 512, the software 82 checks for a sending error. If no error occurred, a flag is set at block 514 indicating that the first location has been sent, and the PHONE_LOC subroutine 500 ends at block 506. If a sending error did occur, the logic may proceed to block 516, where an error is noted and the PHONE_LOC subroutine 500 ends at block 506.

If, at block 508, the first location data has been sent, the logic may proceed to block 518, where the software 82 may determine whether the location update received at block 504 is an accuracy improvement. If the location update is an accuracy improvement, the logic may proceed to block 520, where the software 82 may cause the hand-held device 14 to transmit the accuracy improvement to the server as the first location data, which may overwrite any previously transmitted first location data. From block 520, the PHONE_LOC subroutine 500 may end at block 506. The main loop 302 (FIG. 10) may the repeat the PHONE_LOC subroutine 500, since the state may not have been changed from PHONE_LOC.

However, if the software 82 determines, at block 518, that the location update is not an accuracy improvement, the logic may proceed to block 522, where the software 82 may change the state to VIEW_MAP. From block 522, the PHONE_LOC subroutine 500 may end at block 506. The logic of the main loop 302 (FIG. 10) may subsequently loop back to block 328, where the software 82 may check its current state. Since the state may have been changed to VIEW_MAP in the PHONE_LOC subroutine 500, the logic of the main loop 302 may proceed from block 328 to block 340. At block 340, the message box displayed on the screen 74 at block 338 and/or 332 may be disabled.

At this point, the system 10 may have determined the locations of the vehicle 16 and the hand-held device 14. The software 82 may display the map 17 on the screen 74 which may include the user icon 78 and the vehicle icon 80 corresponding to the locations of the hand-held device 14 and the vehicle 16, respectively. The logic of the software 82 may subsequently proceed to block 342, where the VIEW_MAP subroutine 600 may be initiated.

The VIEW_MAP subroutine 600 may begin at block 602 and subsequently proceed to block 604, where the software 82 may determine whether the location of the hand-held device 14 has been updated beyond a minimum distance. The minimum distance may correspond to the resolution of the map 17 and/or the accuracy or margin of error of the first location of the hand-held device 14. If the updated location of the hand-held device 14 is not beyond the minimum distance, the logic may proceed to block 606, where the software 82 may determine whether the user has pressed an update location (refresh) button 605 or touch-screen interface (FIGS. 6, 15, and 15A). If not, the logic may proceed to block 608, where all location updates except for the most recent previous location update may be removed from an update queue. The VIEW_MAP subroutine 600 may then end at 610, and the main loop 302 may repeat the VIEW_MAP subroutine 600.

However, if the software 82 determines, at block 604 that the updated location of the hand-held device 14 is beyond the minimum distance or the user has pressed the update location button at block 606, the logic may proceed to block 612, where the updated location of the hand-held device 14 may be transmitted to the server. Next, a block 614, the software 82 may determine whether an error occurred in transmitting the updated location. If so, the software 82 may note the error at block 616 and end the VIEW_MAP subroutine 600 at block 610. The VIEW_MAP subroutine 600 may then be repeated according to the logic of the main loop 302.

However, if the software 82 determines, at block 614, that the there was no error in sending the update location, the logic may proceed to block 618, where the software 82 may determine whether the updated location of the hand-held device 14 is within a NEAR range of the vehicle. The NEAR range may be an area surrounding the location of the vehicle 16 such that the vehicle 16 may be visible to the user and/or an area in which the user may be able to hear the horn of the vehicle. For example, the NEAR range may be an area having about a 500 foot radius centered at the location of the vehicle 16. It will be appreciated that the NEAR range may be an area of any suitable radius. Additionally or alternatively, the software 82 may allow the user to customize the radius of the NEAR range.

If the software 82 determines that the updated location is not within the NEAR range, the logic may proceed to block 620 where the update queue may be cleared, and the VIEW_MAP subroutine 600 may subsequently end at block 610 and repeat according to the logic of the main loop 302. However, if the software 82 determines, at block 618, that the updated location is within the NEAR range, the logic may proceed to block 622, where the state may be changed to VIEW_NEAR before the update queue may be cleared at block 620 and the VIEW_MAP subroutine 600 ends at block 610.

Returning to the main loop 302, the software 82 may then determine, at block 328, that the state is set to VIEW_NEAR. Accordingly, the logic of the main loop 302 may proceed to block 344, where the VIEW_NEAR subroutine 700 may be initiated.

Figure 14:
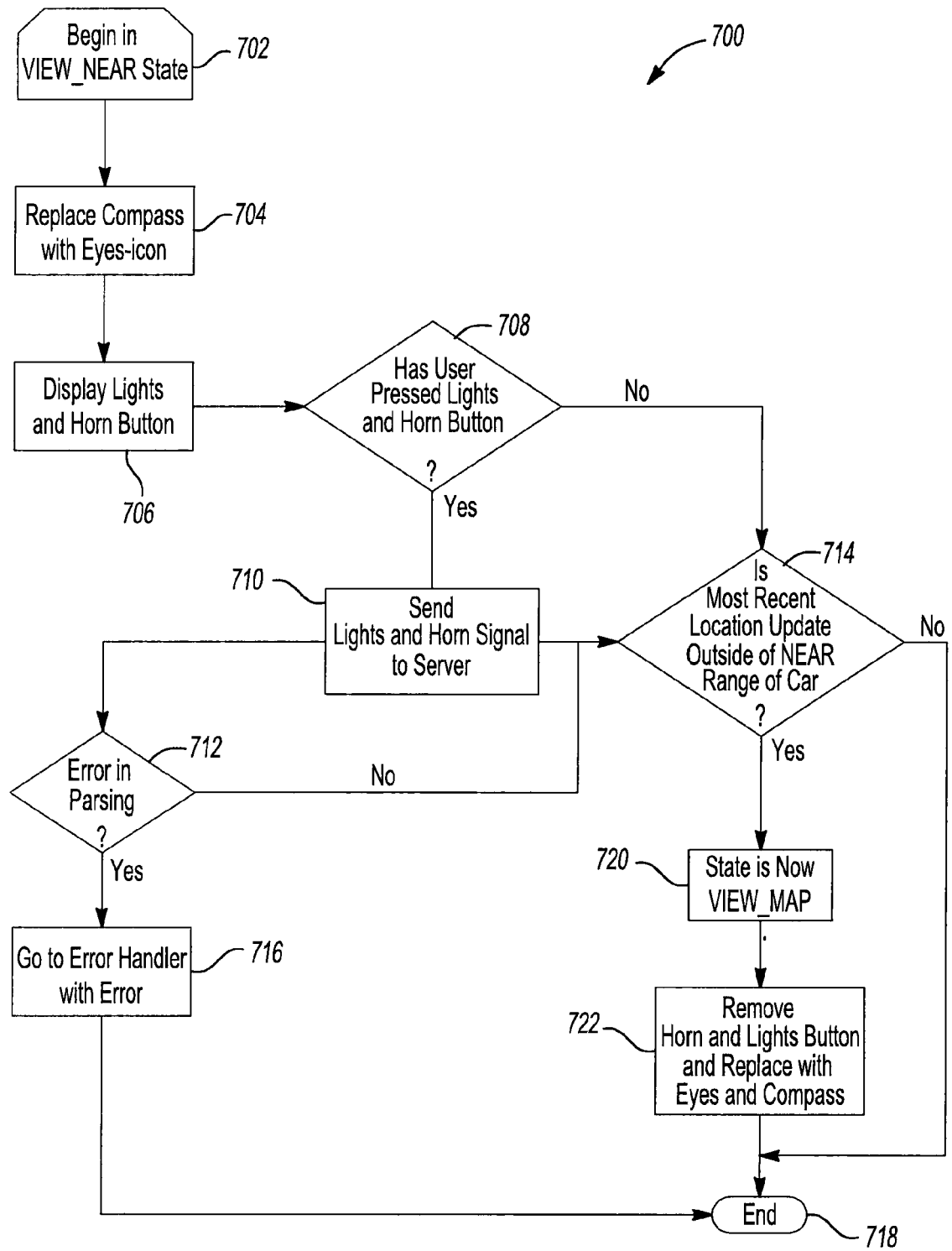
FIG. 14 is a flowchart depicting a scenario of operation of a VIEW_NEAR subroutine of the software of the vehicle locating system according to the principles of the present disclosure.

Referring now to FIGS. 14, 15 and 15A, the VIEW_NEAR subroutine 700 will be described in detail. The VIEW_NEAR subroutine 700 may begin at block 702 and proceed to blocks 704 and/or 706, where an eyes icon 705 and/or a lights/horn button 707 may be displayed on the screen 74, as shown in FIG. 15. Optionally, the software 82 may cause a message to appear on the screen 74 advising the user to press the lights/horn button 707. From block 706, the logic may proceed to block 708, where the software 82 may determine whether the user has pressed (or touched) the lights/horn button 707. If so, the logic may proceed to block 710, where the hand-held device 14 may transmit a signal to the server, which may be subsequently transmitted to the vehicle 16 actuating the lights and/or horn of the vehicle 16, thereby alerting the user to the location of the vehicle 16. Upon actuating the lights and/or horn, a message alerting the user to look and listen for the vehicle 16 may be displayed on the screen 74, as shown in FIG. 15A.

From block 710, the logic may proceed to blocks 712 and 714. At block 712, the software 82 may determine whether an error occurred in sending the signal to actuate the lights and horn. If an error occurred, the logic may proceed to block 716, where the error is noted. The VIEW_NEAR subroutine 700 may be subsequently ended at block 718 and restarted according to the logic of the main loop 302. However, if the software 82 determines that an error has not occurred in sending the signal to actuate the lights and horn, the logic of the VIEW_NEAR subroutine 700 may continue according to block 714.

At block 714, the software 82 may check for an updated location of the hand-held device 14, and may determine if the update location is outside of the NEAR range. If the hand-held device 14 is still within the NEAR range, VIEW_NEAR subroutine 700 may be end at 718 and repeated according to the logic of the main loop 302. However, if the software 82 determines that the hand-held device 14 has moved outside of the NEAR range, the logic may proceed from block 714 to block 720, where the state may be changed back to VIEW_MAP. The lights/horn button 707 and/or eyes icon 705 may be removed from the screen 74 at block 722, and the VIEW_NEAR subroutine 700 may end at block 718.

According to the logic of the main loop 302, the VIEW_MAP subroutine 600 and the VIEW_NEAR subroutine 700 may be repeated until the user exits out of the software 82, for example, when the user has located and/or arrived at the vehicle 16.

Figure 16:
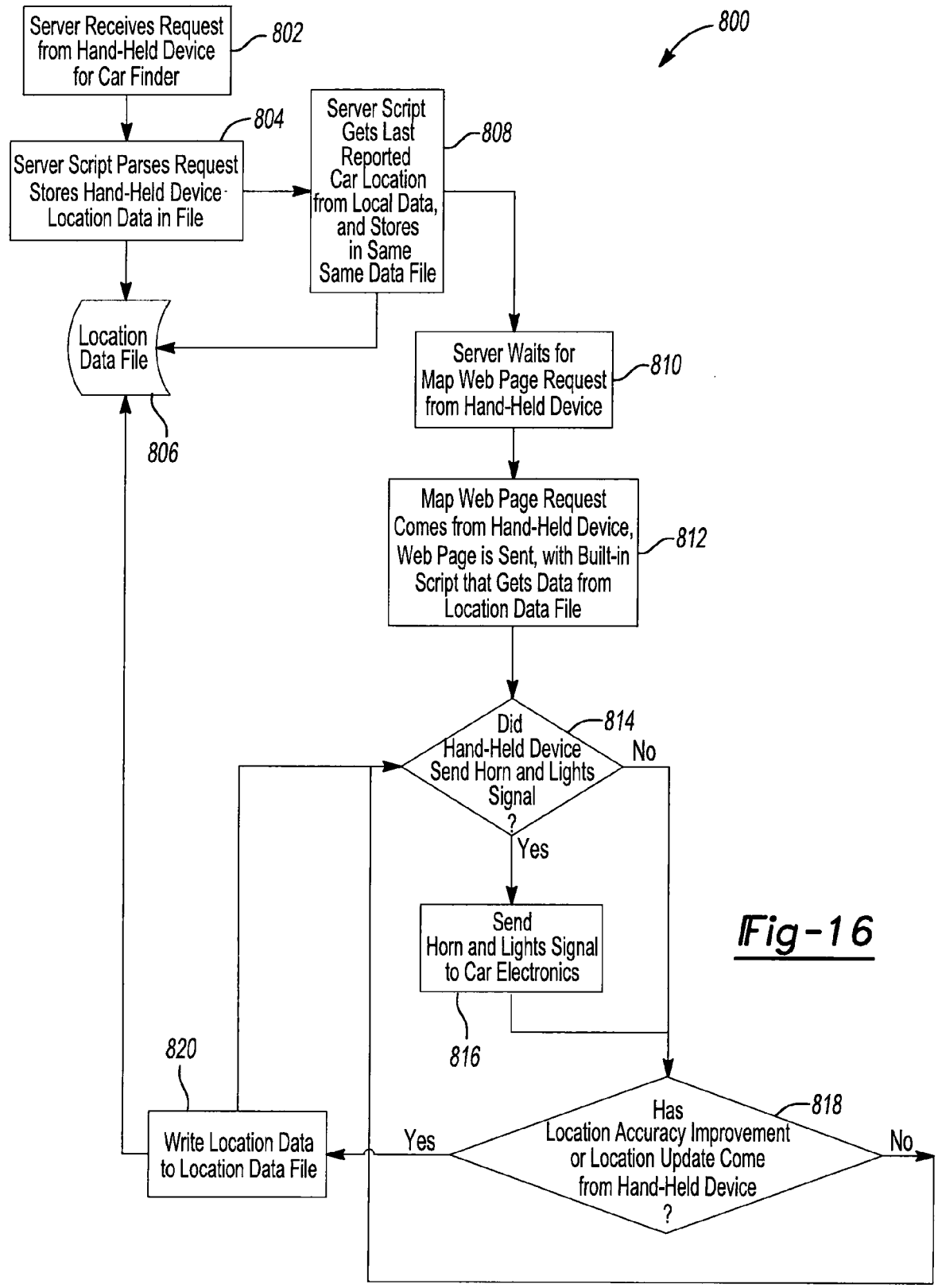
FIG. 16 is a flowchart depicting a scenario of operation of an embodiment of a server of the vehicle locating system according to the principles of the present disclosure.

With reference to FIG. 16, a flowchart 800 depicts a scenario of operation of an embodiment of the server of the system 10. The logic may begin at block 802, where the server may receive a request from the hand-held device 14 for the location of the hand-held device 14 and/or the location of the vehicle 16. At block 804, the server may parse the request and store the location of the hand-held device 14 in a location data file 806. From block 804, the logic may proceed to block 808, where a server script may obtain the last reported location of the vehicle 16 and store the location of the vehicle 16 in the location data file 806.

From block 808, the logic may proceed to block 810, where the server may wait for a map web page request from the hand-held device 14. Next, the logic may proceed to block 812, where the server may receive the request for the map web page from the hand-held device 14. The map 17 may be generated by the map web page, as will be subsequently described, and sent via the server to the hand-held device 14 to be displayed thereon.

Next, the logic may proceed to block 814, at which time the server may determine whether it has received the lights and horn signal sent by the hand-held device 14 at block 710 of the VIEW_NEAR subroutine 700 (FIG. 14) of the software 82. If the lights and horn signal has been sent to the server, the logic may proceed to block 816, where the server may relay the signal to electronics on-board the vehicle 16 to actuate the lights and horn of the vehicle 16. From block 816, the logic may proceed to block 818, or if the server has not received the lights and horn signal from the hand-held device 14, the logic may proceed to block 818 from block 814.

At block 818, the server may check for a location accuracy improvement or location update from the hand-held device 14. If neither a location accuracy improvement or location update has been received, the logic may loop back to block 814 and repeat the operations of blocks 814, 816, and 818. If the server determines, at block 818, that a location accuracy improvement or location update has been received, the logic may proceed to block 820, where the location accuracy improvement or location update may be written to the location data file 806 and stored therein. From block 820, the logic may loop back to block 814 to continuously or intermittently repeat the above described logic until the user exits the software 82 when the user locates and/or arrives at the vehicle 16 or the software 82 is otherwise terminated.

Figure 17:
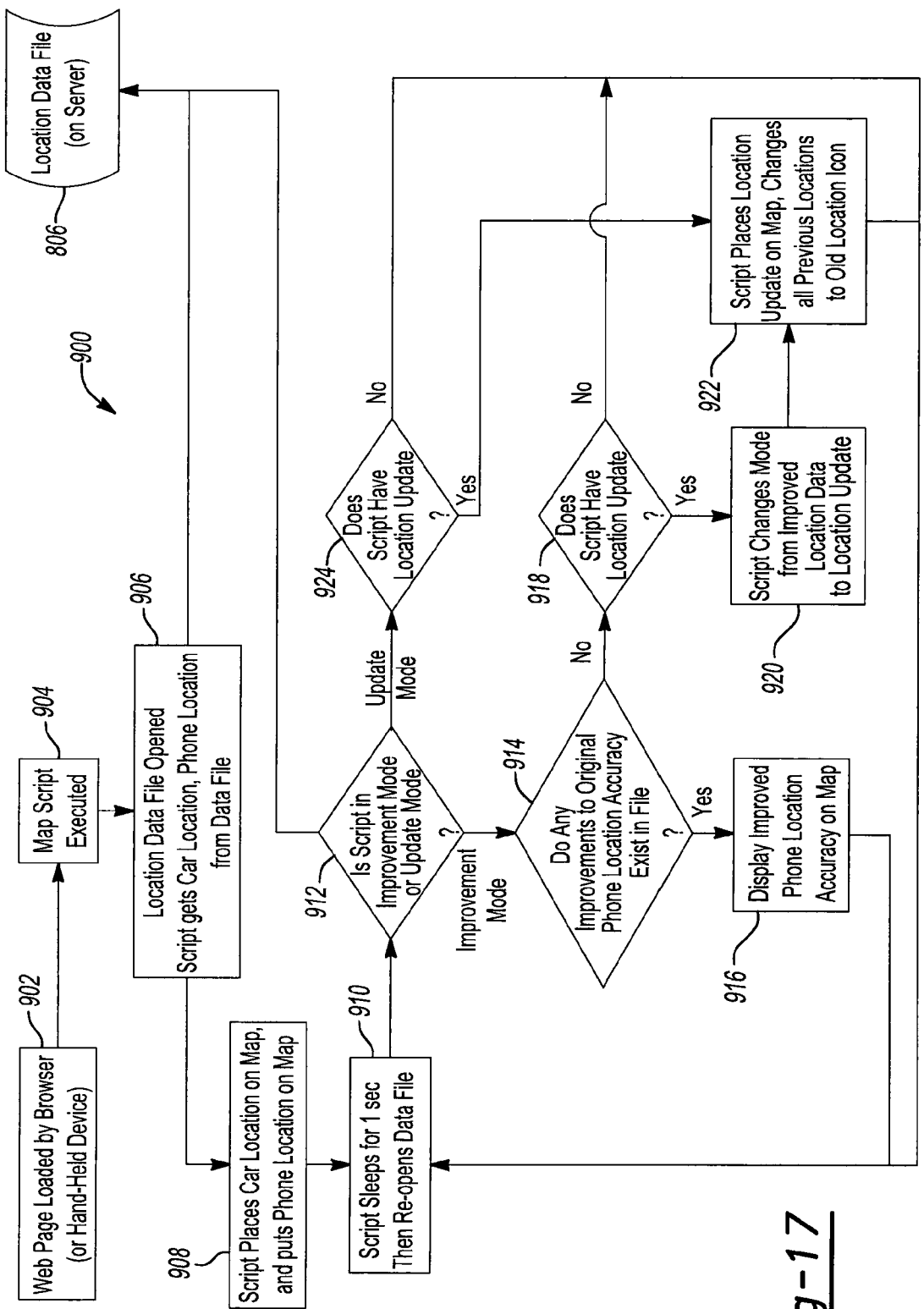
FIG. 17 is a flowchart depicting a scenario of operation of an embodiment of a map web page of the vehicle locating system according to the principles of the present disclosure.

With reference to FIG. 17, a flowchart 900 depicts a scenario of operation of an embodiment of the map web page of the system 10. The logic may begin at block 902, where the map web page may be loaded by a browser installed on the hand-held device 14. At block 904, a map script may be executed. At block 906, the map script may obtain the location of the vehicle 16 and the location of the hand-held device 14 from the location data file 806 of the server. Next, the logic may proceed to block 908, where the map script may generate the map 17 and plot the locations of the vehicle 16 and the hand-held device 14 thereon.

At block 910, the map script may sleet for a predetermined amount of time, such as about one second, for example, and reopen the location data file 806. From block 910, the logic may proceed to block 912, where the web page may determine whether the script is in an improvement mode or an update mode. The improvement mode may be the default mode when the map script is initially executed at block 904. Accordingly, when the script is in the default improvement mode, the logic may proceed to block 914, where the web page may determine whether an accuracy improvement to the original location of the hand-held device 14 exists in the location data file 806. If an accuracy improvement exists, the logic may proceed to block 916, where the location of the hand-held device 14 may be plotted on the map 17 with improved accuracy. Then the logic may loop back to block 910 to sleep for the predetermined amount of time and repeat the logic of block 912.

If at block 914, an accuracy improvement does not exist in the location data file 806, the logic may proceed to block 918, where the web page may determine whether the script has received a location update. If there is no location update, the logic may loop back to block 910 to sleep, reopen the location data file 806, and subsequently repeat the logic of block 912.

However, if the web page determines that the script has received a location update at block 918, the logic may proceed to block 920, where the script may change from the improvement mode to the update mode. From block 920, the logic may proceed to block 922, where the script may plot the location update on the map 17 with the user icon 78. The script may also plot one or more old location icons 92 on the map 17 to indicate one or more of the previous locations of the hand-held device 14. In this manner, a walking path may be plotted on the map 17 with the old location icons 92 and the user icon 78 to indicate a path that the user has actually traveled on his or her way to the location of the vehicle 16.

From block 922, the logic may loop back to block 910, where the script may sleep and reopen the location data file 806 and repeat the logic of block 912. If the script was changed to the update mode at block 920, the logic may proceed from block 912 to block 924, where the script may check for another updated location of the hand-held device 14. If no further location update has been received, then the logic may loop back to block 910 and repeat the logic of block 912 described above. However, if the an updated location of the hand-held device 14 has been received, then the logic may proceed to block 922, where, as described above, the script may move the user icon 78 to the updated location on the map 17. Any previous location of the hand-held device 14 can be indicated with the old location icon 92. From block 922, the logic may loop back to block 910 to sleep, reopen the data location file 806 and repeat block 912. This process may be repeated until the user exits the software 82 when the user locates and/or arrives at the vehicle 16 or the software 82 is otherwise terminated.

Referring again to FIGS. 1-17, the system 10 may include many advantages. For example, as described above, the hand-held device 14 may communicate with the communication device 12, which may be installed in or otherwise on-board the vehicle 16. Accordingly, the user does not have to communicate the location of the vehicle 16 to the system 10 when the user parks and/or leaves the vehicle 16. Therefore, even if the user of the hand-held device 14 is not a person who parked the vehicle 16 or was in or proximate to the vehicle 16 when it was parked, the system 10 may still locate the vehicle 16. Even if a person moves the vehicle 16 and does not communicate the new location of the vehicle 16 to the user, the user can still locate the vehicle 16 and obtain directions to the vehicle 16. In this manner, the system 10 could be used by law enforcement personnel, for example, to track and/or recover stolen or lost vehicles.

The system 10 may additionally or alternatively include one or more of the following features: (1) a voice command module such to enable the user to navigate the software 82 without having to press buttons or a touch-screen interface, and/or to enable hands-free operation the hand-held device 14; (2) one or more security features preventing unauthorized users from accessing the location of a particular vehicle 16 and/or a particular hand-held device 14; (3) a compass indicator showing the general direction in which the user must travel to locate the vehicle 16; (4) dynamic updates of the compass indicator as the user carries the hand-held device 14 toward the vehicle 16; (5) a scalable (zoom-in, zoom-out) view of the map 17 that permits the user to obtain a more detailed view of the road network within walking distance (about 1 mile, for example) of the location of the hand-held device 14 and/or the location of the vehicle 16; (6) the hand-held device 14 may vibrate and/or emit an audible chime or tone when the position of the user icon 78 is updated on the screen 74; (7) automatic sensing of available networks for transmission of data, such as a 3G (or any other generation) network, a local Wi-Fi network, a cellular communication network, or any other wireless communication network; (8) automated connection to a best available network; (9) use of "Street View" options with an Internet map service to give the option of depicting a "Street View" of the location of the hand-held device 14 and/or the location of the vehicle 16; (10) the user may have an option to view available images from local security cameras, such as a parking lot of a business or shopping mall, for example, or any other local information stream related to security cameras; (11) the system 10 may utilize cameras on a vehicle which may be internal security cameras, or external parking-assist cameras such that the user may view images on the screen 74 of the hand-held device 14 that may be sent from the internal-security cameras or external parking-assist cameras; (12) the user may utilize any security system images made available by parking structure monitor systems and view images on the screen 74 of the hand-held device 14; (13) the user may have the option to send a signal to the vehicle 16 to instruct the vehicle 16 to then move to meet the user. These options may be dependant on the availability of vehicles and parking lots equipped to accommodate self-driving vehicles. Images from the cameras described above may include the vehicle 16 and its surroundings. Such images may be communicated to and displayed on the hand-held device 14 to assist the user in recognizing the surroundings of the vehicle 16. In this manner, the user may recognize the location of the vehicle 16 relative to a landmark or other object shown in the camera images. It is contemplated that additional features not listed above may be incorporated into the system 10.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A system for locating a vehicle comprising:
    a hand-held device having a screen, the hand-held device configured to import a map and display the map on the screen along with a present location of the hand-held device on the map; and
    a communication device on-board the vehicle configured to communicate a present location of the vehicle to the hand-held device, the hand-held device displaying the location of the vehicle and the location of the hand-held device on the map at the same time; wherein
    the hand-held device is operable to prompt the communication device to determine and communicate the present location of the vehicle to a server;
    the hand-held device includes a user input device displayed on the screen and operable to send a signal to the server to actuate at least one of a horn and a light of the vehicle; and
    the signal to actuate at least one of the horn and the light is transmitted by the server to the vehicle to activate the at least one of the horn and the light;
    wherein the user input device is activated when the location of the hand-held device is within a specified distance from the location of the vehicle.

2. The system of claim 1, wherein the hand-held device is adapted to determine an updated location of the hand-held device and update the map to indicate the updated location of the hand-held device.

3. The system of claim 2, wherein the hand-held device is adapted to at least intermittently update the map to track movement of the hand-held device relative to the vehicle.

4. The system of claim 1, wherein the map includes a first icon associated with the location of the hand-held device and a second icon associated with the location of the vehicle.

5. The system of claim 1, wherein the map includes a satellite image of the locations of the vehicle and hand-held device.

6. The system of claim 1, wherein the hand-held device is a mobile phone.

7. The system of claim 1, wherein the server is in communication with the hand-held device, the communication device and the internet.

8. The system of claim 1, wherein the user input device is displayed on the screen only when the map is displayed on the screen along with the present location of the hand-held device and the location of the vehicle.

9. The system of claim 1, wherein the specified distance can be set by a user of the hand-held device.

10. A system for locating a vehicle comprising: a server; a first global positioning device in remote communication with the server, the first global positioning device being configured to determine a location of the vehicle and communicate the location of the vehicle to the server; and a hand-held device including a processor, a screen, and a second global positioning device integrated therein, the second global positioning device is configured to determine a location of the hand-held device, the hand-held device is configured for remote communication with the server, and the screen is configured to display a map, wherein the location of the vehicle and the location of the hand-held device are displayed on the map together; the hand-held device includes a user input device displayed on the screen and operable to send a signal to the server to actuate at least one of a horn and a light of the vehicle; and the signal to actuate at least one of the horn and the light is transmitted by the server to the vehicle to activate the at least one of the horn and the light;

wherein the user input device is activated when the location of the hand-held device is within a specified distance from the location of the vehicle.

11. The system of claim 10, wherein the first global positioning device is operable to communicate the location of the vehicle to the server.

12. The system of claim 10, wherein the second global positioning device is adapted to determine an updated location of the hand-held device and the hand-held device is adapted to update the map to indicate the updated location of the hand-held device.

13. The system of claim 12, wherein the hand-held device is adapted to at least intermittently update the map to track movement of the hand-held device relative to the vehicle.

14. The system of claim 10, wherein the map includes a first icon associated with the location of the hand-held device and a second icon associated with the location of the vehicle.

15. The system of claim 10, wherein the hand-held device is a mobile phone.

16. The system of claim 10 wherein the hand-held device is an iPhone®.

17. The system of claim 10, wherein the user input device is displayed on the screen only when the map is displayed on the screen along with the present location of the hand-held device and the location of the vehicle.

* * * * *